No. 769,985. Patented September 13, 1904.

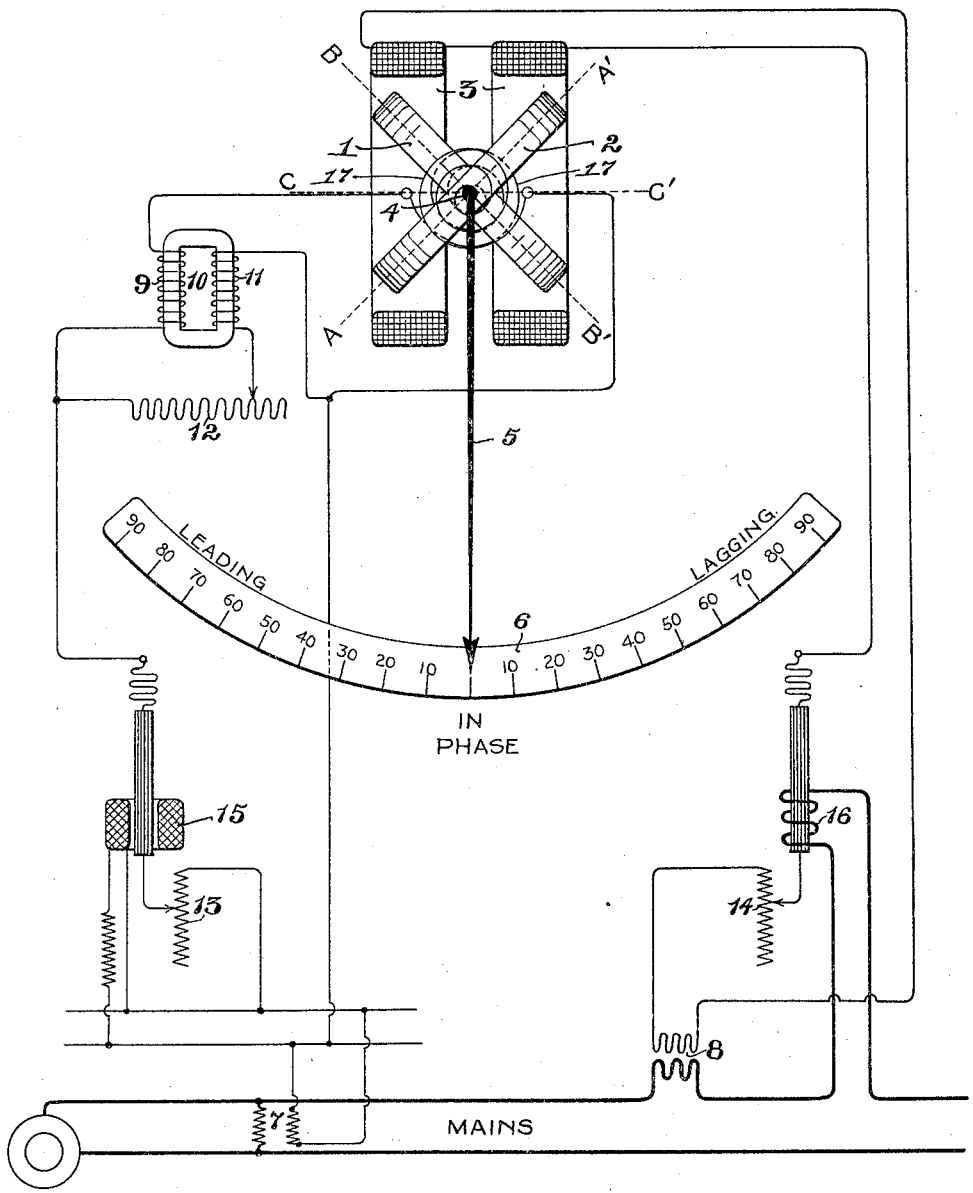

UNITED STATES PATENT OFFICE.

THOMAS DUNCAN, OF CHICAGO, ILLINOIS.

ELECTRICAL MEASURING INSTRUMENT.

SPECIFICATION forming part of Letters Patent No. 769,985, dated September 13, 1904.

Application filed June 26, 1901. Serial No. 66,100. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 3,) of which the following is a full, clear, concise, and exact description, reference being had to the accompanying drawing, forming a part of this specification.

My invention relates to means for indicating the phase difference between the current and pressure in alternating-current circuits.

The invention relates to those instruments that serve to indicate the power factor of alternating-current circuits either by indicating the power factor alone without showing whether the current leads or lags in phase with respect to the impressed pressure, as set forth in my accompanying application, Serial No. 66,098, filed June 26, 1901, or by indicating not only the extent to which the current differs in phase from the pressure, but also whether it leads or lags, as indicated in my copending application, Serial No. 66,099, filed June 26, 1901. For the sake of illustrating the application of my present invention I have set forth the nature of the invention of the latter of my said copending applications. An instrument embodying the principles of both my said inventions and specifically constructed in accordance with the latter is provided with a current field-winding, producing magnetism that varies in phase with the phase of the current in the working circuit, and with this current-winding are associated two pressure-windings, one of which coacts with the current-winding to effect the movement of a measuring-needle to indicate the extent the current may lag behind the impressed pressure, while the current-winding is also associated with a second pressure-winding coacting therewith to produce a movement of the needle that indicates the extent to which the current leads the pressure in phase.

In practicing my invention I preferably provide pressure-windings that produce fields in quadrature with the impressed pressure, the fields due to these pressure-windings being one hundred and eighty degrees apart in phase. The magnetism due to the current-winding is displaced ninety degrees from the magnetism due to either of the pressure-windings when the current in the working circuit is in phase with the impressed electromotive force. To secure a movement of the measuring element or indicating-needle to indicate a variation in phase between the current and impressed electromotive force, the said current-winding is made movable with respect to the pressure-windings, the current-winding itself being preferably rotatable and carrying the indicating-needle. The movable coil is preferably held in its zero position by spiral springs, and any turning motion of the pointer must take place against the tension of the springs. The current-winding is so disposed upon its shaft that when the current and pressure in the working circuit are in phase the current-winding lies midway between the pressure-windings and is unaffected thereby. Upon change in phase between the current and the impressed pressure the field of the current-winding of the instrument will correspondingly vary in phase, whereby one or the other of the magnetic axes due to the pressure-windings will cause the magnetic axis of the current field-winding to approach the same until a balance is brought about between the three magnetic fields of the instrument, as a result of which the indicating-needle is brought to one side or the other of a central position to indicate whether or not the current leads or lags and to what extent. I preferably associate with the indicating-needle a scale upon which scale-marks are provided indicating in degrees the lagging and leading angles. This scale thus marked will also indicate to those skilled in the art the power factor of the system—that is, the scale-marks indicating ten degrees lag or lead correspond to the power factor of .9848. The scale-marks "20" correspond to the power factor of .9397. The scale-marks "30" correspond to the power factor of .866. The scale-marks "40" correspond to the power factor of .766. The scale-marks "50" correspond to the power factor of .6428. The scale-marks "60" correspond to the power factor of .5. The scale-marks "70" correspond to the power factor of .342. The scale-marks "80" correspond to the power factor of .1736. The scale-marks "90" correspond to the power factor of 0.

In each of my said copending applications I have provided manually-operated rheostats for securing a suitable ratio between the magnetizing effects of the measuring instrument, whereby the effects of variation of current and pressure in the working circuit would be eliminated, so that the instrument would be governed solely in its operation by a variation in the phase between the current and pressure. I have provided a resistance in circuit with each winding of the instrument for this purpose.

It is the object of my present invention to provide automatic means governed by the load conditions of the circuit for securing this desired ratio of the magnetic fields, so that the power factor or phase-angle indicator is capable when connected in circuit of at once indicating the phase relation between the current and pressure of the working circuit, all manual operation being thus dispensed with.

I have herein provided an electromagnet for each circuit, preferably in the form of a solenoid, whose core is operatively connected with the switching-arm of the rheostat, the strength of the solenoid varying with the current flowing through the same to effect a corresponding adjustment of the core and the amount of resistance included in the corresponding circuit, so that upon a variation in current and pressure a corresponding variation of the solenoid magnetism is secured that preferably actuates the solenoid-cores to maintain the magnetism due to each winding constant.

I will explain my invention more fully by reference to the accompanying drawing, illustrating the preferred embodiment thereof.

The drawing is a diagrammatic view illustrating a circuit including an alternating-current generator and the instrument of my invention associated therewith.

The pressure-windings 1 and 2 are together mounted upon a rotatable shaft 4, upon which the pointer 5 is also mounted. This pointer is normally maintained at its zero position by the action of the two spiral springs 17 17, which further serve to conduct the current to the pressure-windings. The current-winding 3 is preferably subdivided into two coils. The pointer 5 travels over the scale 6, with the middle point of which the pointer is adapted to register when the current and pressure in the working or transmission circuit are in phase. The scale 6 may be provided with a series of scale-marks that may serve to indicate when the needle registers therewith the extent to which the current and pressure are out of phase. The scale-marks are symmetrically arranged with respect to the central point with which the needle 5 registers when the current and pressure in the working circuit are in phase, the current when lagging in phase causing a deflection of the needle 5 toward the right to indicate the angle of lag, while the current in leading causes a deflection of the needle 5 toward the left to indicate the angle that the current leads. The pressure-coils 1 and 2 thus occupy a medium position when the current and pressure in the work-circuit are in phase, to secure which adjustment of the coils a balanced condition must be brought about between the fields due thereto and the field of the current-winding 3. This balanced condition is brought about by having the magnetism due to the current-winding 3 differing ninety degrees from the magnetism due to the coils 1 and 2. As the current and pressure in the working circuit vary in phase, obviously the phase of the magnetism due to the current-winding 3 varies with relation to the magnetism due to the windings 1 and 2, whereby the magnetic axis of one or the other of the pressure-windings is caused to approach that of the current-winding. The winding 1 may produce a field that lags ninety degrees behind the impressed pressure, the line A A' indicating the magnetic axis of this field. The winding 2 produces a magnetic field that leads ninety degrees with respect to the impressed pressure, the line B B' indicating the axis of this field. The line C C' indicates the axis of the magnetic field due to the winding 3. If the current in the main circuit lags, the magnetism C C' due to the winding 3 also lags, thereby approaching the magnetism A A' in phase and causing a movement of the windings 1 and 2 and the pointer 5 in a contra-clockwise direction against the restraining torque of the springs 17 17 to indicate upon the scale 6 the angle of lag. If the current in the main circuit leads with respect to the impressed pressure, the magnetism C C' approaches the magnetism B B' in phase, thereby causing a clockwise movement of the pointer 5 to indicate upon the scale 6 the angle at which the current leads the pressure. Any well-known means may be employed for securing magnetic fields in the windings of the meter having the desired phase displacements. I have illustrated a transformer 7, having its primary included in bridge of the working circuit and its secondary connected in circuit with both pressure windings or coils 1 and 2. The current-winding 3 is supplied from a transformer 8, whose primary winding is included in one of the main conductors and whose secondary winding is included in a closed local circuit with the said current-winding. I have illustrated the windings 1 and 2 included serially in the same circuit with the secondary of the transformer 7. This circuit serially includes the winding 9 of a transformer 10, the remaining winding 11 of the transformer 10 being in parallel with the secondary of the transformer 7 and the windings 1 and 2. An adjusting resistance 12 is included in circuit with the transformer-winding 11. To secure a phase displacement of one hundred and eighty degrees between the fields due to the windings 1 and 2, the said windings are reversed with respect to each other.

In order to maintain the ratio of the magnetizing effects of the windings of the meter constant, automatic compensating means—in this instance in the form of automatically-operated rheostats 13 and 14—are employed, the rheostat 13 being included in circuit with the pressure-windings. Rheostats 13 and 14 are provided with solenoid-helices 15 and 16 in bridge between the mains and in series with one of the mains, respectively. As the voltage increases and diminishes the strength of the field due to the coil 15 increases and diminishes, thereby increasing and decreasing the amount of the resistance of the rheostat 13 in circuit with the pressure-windings 1 and 2, thereby maintaining the magnetizing effects due to these windings constant. As the current through the transmission-main and the solenoid-coil 16 increases and decreases the strength of the magnetism due to this coil correspondingly increases and decreases to include and exclude resistance of the rheostat 14 from the circuit including the current-winding 3, whereby the magnetizing effect due to the current-winding is maintained constant. Thus I provide an automatic means which serves to maintain the required ratio of magnetism between the coils of the instrument. When the current and pressure in the work or transmission circuit are in phase, the phase of the field due to the current-winding 3 is displaced ninety degrees from the fields due to windings 1 and 2, as heretofore set forth, and a change in phase of the current in the work or transmission circuit causes a corresponding change in the phase relation of the magnetism of the current and pressure windings and a deflection of the needle 5 to indicate a lagging or leading current and its phase relation to the pressure, all as heretofore set forth.

While I have herein shown and particularly described the preferred embodiment of my invention, it is obvious that changes may readily be made without departing from the spirit thereof, and I do not wish, therefore, to be limited to the precise disclosures herein set forth; but

Having thus described my invention, I claim as new and desire to secure by Letters Patent—

1. The combination with a system of alternating-current distribution, of a measuring instrument for indicating the lag and lead of the current, having pressure-windings producing fields out of phase, a current-winding, means whereby the current-winding may produce a field varying in phase with the phase of the current of the system and differing in phase from both pressure-windings, and automatic means associated with said windings, whereby the magnetizations due to the windings are maintained constant, substantially as described.

2. The combination with a system of alternating-current distribution, of a measuring instrument for indicating the lag and lead of the current, having pressure-windings producing fields out of phase, a current-winding subject to the action of both pressure-windings, means whereby the current-winding may produce a field varying in phase with the phase of the current of the system and differing in phase from both pressure-windings, and automatic means associated with said windings, whereby the magnetizations due to the windings are maintained constant, substantially as described.

3. The combination with a system of alternating-current distribution, of a measuring instrument for indicating the lag and lead of the current, having pressure-windings producing fields out of phase, a current-winding, means whereby the current-winding may produce a field varying in phase with the phase of the current of the system and differing in phase from both pressure-windings, and automatically-operated rheostats associated with said windings, whereby the magnetizations due to the windings are maintained constant, substantially as described.

4. The combination with a system of alternating-current distribution, of a measuring instrument for indicating the lag and lead of the current, having pressure-windings producing fields out of phase, a current-winding subject to the action of both pressure-windings, means whereby the current-winding may produce a field varying in phase with the phase of the current of the system and differing in phase from both pressure-windings, and automatically-operated rheostats associated with said windings, whereby the magnetizations due to the windings are maintained constant, substantially as described.

5. The combination with an alternating-current system of distribution, of a measuring element, means operated by the current in the system for effecting movement thereof to indicate the difference in phase between the current and pressure, and automatic means associated with said windings for maintaining constant the magnetizations due to said windings of the instrument to eliminate the effects due to variation in the load conditions of the circuit, substantially as described.

6. The combination with an alternating-current system of distribution, of current and pressure field-windings energized by the current in the system, a movable measuring element, the said windings exerting torque upon the movable measuring element to indicate the phase difference between the current and the pressure in the system, and automatic means associated with said windings for maintaining constant the magnetizations due to said windings of the instrument to eliminate the effects due to variation in the load conditions of the circuit, substantially as described.

7. The combination with an alternating-current system of distribution, of a measuring element, means operated by the current in the system for effecting movement thereof to indicate the difference in phase between the current and pressure, and automatically-operated rheostats associated with said windings having energizing-helices, one subject to the varying pressure of the system and the other to the varying current, whereby the magnetizations due to the windings are maintained constant to eliminate the effects due to variation in the load conditions of the circuit, substantially as described.

8. The combination with an alternating-current system of distribution, of current and pressure field-windings energized by the current in the system, a movable measuring element, the said windings exerting torque upon the movable measuring element to indicate the phase difference between the current and the pressure in the system, and automatically-operated rheostats associated with said windings having energizing-helices, one subject to the varying pressure of the system and the other to the varying current, whereby the magnetizations due to the said current and pressure windings are maintained constant, to eliminate the effects due to variation in the load conditions of the circuit, substantially as described.

9. The combination with an alternating-current system of distribution, of two pressure-windings producing out-of-phase fields and supplied with current from the said system, a current-winding supplied with current from the said system, a measuring element subjected to the torque of the said current and pressure windings to indicate the phase difference between the current and pressure in the system, and automatic means associated with said windings for maintaining constant the magnetizations due to the windings of the instrument to eliminate the effects due to variation in the load conditions of the circuit, substantially as described.

10. The combination with an alternating-current system of distribution, of two pressure-windings producing out-of-phase fields and supplied with current from the said system, a current-winding supplied with current from the said system, a measuring element subjected to the torque of the said current and pressure windings to indicate the phase difference between the current and pressure in the system, and automatically-operated rheostats associated with said windings having energizing-helices, one subject to the varying pressure of the system and the other to the varying current, whereby the magnetizations due to the current and pressure windings are maintained constant to eliminate the effects due to variation in the load conditions of the circuit, substantially as described.

11. The combination with an alternating-current system of distribution, of two pressure-windings producing fields differing one hundred and eighty degrees in phase and supplied with current from the said system, a current-winding supplied with current from the said system, a measuring element subjected to the torque of said current and pressure windings to indicate the phase difference between the current and pressure in the system, and automatic means associated with said windings for maintaining constant the magnetizations due to the windings of the instrument to eliminate the effects due to variation in the load conditions of the circuit, substantially as described.

12. The combination with an alternating-current system of distribution, of a current-winding and a pressure-winding receiving current from the said system, an indicating device actuated upon variation in phase between the fields produced by the said windings to indicate the phase displacement between the current and pressure in the system, and automatic means associated with said windings, whereby the magnetizations due to the current and pressure windings are maintained constant.

13. The combination with an alternating-current system of distribution, of a current-winding and a pressure-winding receiving current from the said system, an indicating device actuated upon variation in phase relation between the fields produced by the said windings to indicate the phase displacement between the current and pressure in the system, and automatically - operated rheostats associated with said windings whereby the magnetizations due to said current and pressure windings are maintained constant to eliminate the effects due to variation in the load conditions of the circuit, substantially as described.

14. The combination with an alternating-current system of distribution, of a current-winding and a pressure-winding receiving current from the said system, an indicating device actuated upon variation in phase between the fields produced by the said windings to indicate the phase displacement between the current and pressure in the system, and electromagnetic means associated with said windings, whereby the magnetizations due to said current and pressure windings are maintained constant to eliminate the effects due to variation in the load conditions of the circuit, substantially as described.

15. The combination with a system of alternating-current distribution, of a measuring instrument having pressure-windings producing fields out of phase, a current-winding having a field varying in phase with the phase of the current of the system, and automatic means associated with said windings, whereby the magnetizations due to the windings of the meter are maintained constant, substantially as described.

16. The combination with a system of alternating-current distribution, of a measuring instrument having pressure-windings producing fields out of phase, a current-winding producing a field varying in phase with the current of the system, and automatically-operated rheostats associated with said windings, whereby the magnetizations due to the windings of the meter are maintained constant, substantially as described.

17. In a measuring instrument for indicating the lag and lead of the current, the combination with pressure-windings producing fields out of phase, of a current-winding, means whereby the current-winding may produce a field varying in phase with the phase of the current of the system and differing in phase from both pressure-windings, and automatic means associated with said windings, whereby the magnetizations due to the windings of the meter are maintained constant, substantially as described.

18. In a measuring instrument for indicating lag and lead of the current in an alternating-current system of distribution, the combination with pressure-windings producing fields out of phase, of a current-winding subject to the action of both pressure-windings, means whereby the current-winding may produce a field varying in phase with the phase of the current of the system and differing in phase from both pressure-windings, and automatically-operated rheostats, whereby the magnetizing effects due to the windings of the meter are maintained in a required ratio, substantially as described.

19. The combination with a system of alternating-current distribution, of a measuring instrument for indicating difference in phase for determining the current in the system, having pressure-windings producing fields out of phase and a current-winding, the said pressure-windings being subject to pressure of the system and said current-windings being subject to the current of the system, means for governing the current in the pressure-windings and electromagnetic means subject to the pressure of the system operating the aforesaid means, substantially as described.

20. The combination with a system of alternating-current distribution, of a measuring instrument for indicating difference in phase for determining the current in the system, having pressure-windings producing fields out of phase and a current-winding, the said pressure-windings being subject to pressure of the system and said current-windings being subject to the current of the system, means for governing the current in the current-windings and electromagnetic means subject to the current of the system for operating the aforesaid means, substantially as described.

21. The combination with a system of alternating-current distribution, of a measuring instrument for indicating phase difference between the current and the pressure of the system having pressure-windings producing field out of phase, and current-winding apparatus for governing the current in said windings, and electromagnetic apparatus subject to the current and pressure of the system for controlling the aforesaid apparatus, substantially as described.

22. The combination with a system of alternating-current distribution, of a measuring instrument for indicating difference in phase between current and pressure of the system, means for governing the pressure to which the instrument is subject and electromagnetic means subject to the pressure of the system for controlling the aforesaid means, substantially as described.

23. The combination with a system of alternating-current distribution, of a measuring instrument for indicating difference in phase between current and pressure of the system, means for governing the current to which the instrument is subject and electromagnetic means subject to the current of the system for controlling the aforesaid means, substantially as described.

24. The combination with a system of alternating-current distribution, of a measuring instrument for indicating difference in phase between current and pressure of the system, apparatus for governing the current and pressure to which the instrument is subject and electromagnetic apparatus subject to the current and pressure of the system for controlling the aforesaid apparatus, substantially as described.

In witness whereof I hereunto subscribe my name this 23d day of May, A. D. 1901.

THOMAS DUNCAN.

Witnesses:
 GEORGE L. CRAGG,
 HERBERT F. OBERGFELL.